July 14, 1931.  G. J. HACHMEISTER  1,814,691
VALVE
Filed May 20, 1929
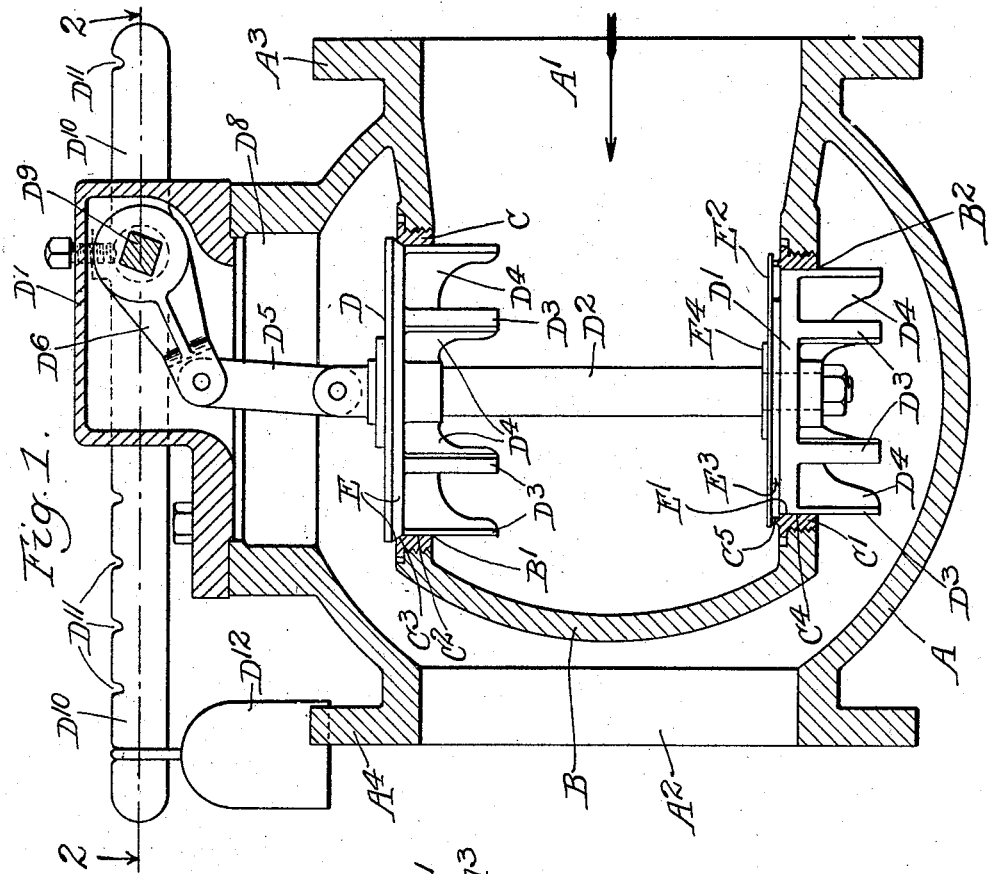
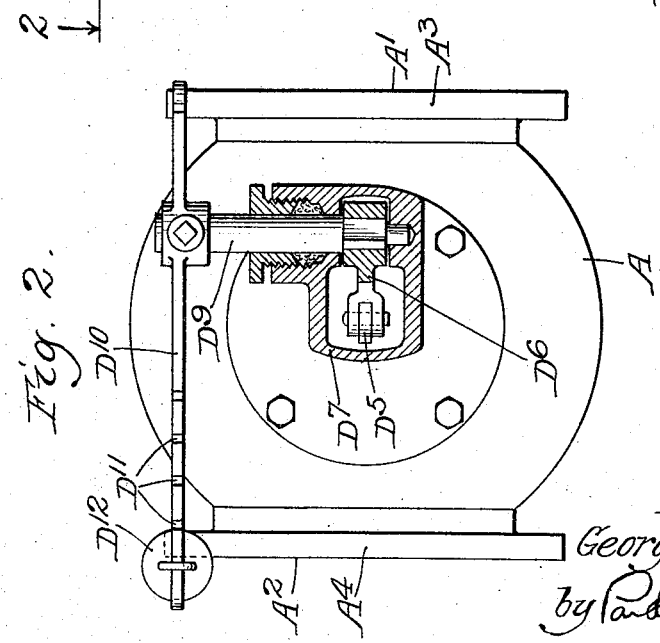
Inventor
George J. Hachmeister
by Parker & Carter,
Attorneys Patented July 14, 1931                                                                  1,814,691

UNITED STATES PATENT OFFICE

GEORGE J. HACHMEISTER, OF DES PLAINES, ILLINOIS, ASSIGNOR TO G. M. DAVIS REGULATOR COMPANY, OF CHICAGO, ILLINOIS, A CORPORATION OF ILLINOIS

VALVE

Application filed May 20, 1929.   Serial No. 364,358.

My invention relates to improvements in valves for controlling steam, gas, air and the like and has for one object to provide in connection with a balanced valve which may be balanced to a great or less extent as the case may be, means whereby the two valve members may always be seated and leakage be prevented independent of changes in temperature or pressure wherein the two valve members themselves are rigidly and positively connected. Another object of my invention is to associate with a rigid valve member automatic positive packing means for preventing leakage. Another object is to provide leakage preventing means in connection with a reciprocating valve member positively operated independent of position of the valve member in its seat after initial closing and wherein movement of the valve member in the direction of opening will immediately unseat and release the leakage wheel. Other objects of the invention will appear from time to time throughout the specification and claims.

My invention is illustrated more or less diagrammatically in the accompanying drawings, wherein—

Figure 1 is a longitudinal section;

Figure 2 is a section along the line 2—2 of Figure 1.

Like parts are indicated by like characters throughout the specification and drawings.

A is a spherical valve housing having an inlet passage $A^1$ and discharge passage $A^2$, there being the usual flanges $A^3$ $A^4$ around such passages to connect them with pipes or conduits in the usual way.

Contained within the valve is an interior wall B ported above and below as at $B^1$ $B^2$, these ports being concentric so that when open, gas which enters the passage $A^1$ passes out through the ports $B^1$ and $B^2$ into that part of the valve exterior to the member B and thus out through the passage $A^2$.

Threaded in each of the ports $B^1$ $B^2$ are valve seat rings C $C^1$. The valve seat ring C has a cylindrical portion $C^2$ terminating in an outwardly expanding tapered cut valve seat $C^3$. The seat ring $C^1$ has a cylindrical portion $C^4$ and terminates at its upper edge in an annular flange or packing seat $C^5$.

D $D^1$ are rigid valve discs positively fixed in position on the valve stem $D^2$. They are guided as they reciprocate through the seat rings C $C^1$ by guide ribs $D^3$ formed by radial flanges $D^4$. $D^5$ is a link pivoted on the upper end of the stem $D^2$ and carried by the valve control lever $D^6$ in a housing $D^7$ which registers with the opening $D^8$ in the top of the valve body. $D^9$ is a control shaft pivoted in and extending through the wall of the housing $D^7$ and having thereon a counterweight lever $D^{10}$ notched at $D^{11}$ to carry the counterweight $D^{12}$ adjustable in position to provide a balance for the valve. The valve D is larger in diameter than the valve $D^1$ so that there is a slight unbalance which must be counterbalanced by the weight $D^{12}$ to maintain the valve seated, the arrangement being such that when the pressure exceeds a predetermined amount the unbalance of the two valve discs will overcome the weight of the counterweight and open the valves.

The valve disc D terminates in a tapered seat engaging flange E so that this valve disc guided in the seat ring comes to a positive seat on the ring and may be ground to make a tight fit thereby preventing leakage. The same thing could be done for the lower valve if it were not for the fact that the changes in temperature and pressure change the length of the valve stem and the distance between the two valve seats. Therefore the valve disc $D^1$ has no such taper flange but closes with respect to the seat $C^1$ by the cylindrical wall $E^1$ penetrating the ring $C^1$, there being only sufficient clearance between the cylindrical portion of the valve and the seat to permit movement of the valve. Such clearance, however, always results in a certain amount of leakage. This leakage is prevented by the use of a flexible plate or packing ring $E^2$. This ring is preferably annular, encircles the stem $D^2$ and is held upon an abutment or boss $E^3$ on the upper face of the valve disc $E^1$ by means of a washer $E^4$ which may be held against the abutment in any suitable way. This packing ring extends outwardly beyond the periphery of the valve disc $D^1$ and engages the packing seat C⁵ as indicated. Assuming the valve D as being seated on the seat C, the packing disc E² will be preferably so positioned with respect to its seat B² that when the distance between the valve D and the disc E² has a minimum, there will still be a contact between the parts B² and E² and the valve will be closed. If for any reason either wear of the valve surfaces associated with the parts C—D or expansion and contraction of the parts, the distance between the valve combination C—D and the valve combination B²—E² increases, the valve combination C—D can remain seated, the flexibility of the packing ring E² taking care of any difference of dimensions within the reasonable working range of the valve. When the valve commences to open, upward movement of the valve will not at first exceed the B²—E² combination. The ring E² will bend remaining in contact with the seat B² until the ring E² engages the member D¹ at which time it will be lifted off its seat.

The use and operation of my invention are as follows:

This valve floats on the line being closed when pressure on the right hand side is below a predetermined amount and opens automatically owing to its unbalance when pressure exceeds a predetermined amount. Whenever the valve is seated the upper portion is positively closed by the positive seating of the inclined flange on the valve disc with the inclined seat on the valve ring but there is always leakage between the two interrupting lower cylindrical valve members. leakage is small but always present and it must be present because in order that the valve may work there must be a clearance between the cylindrical valve and the cylindrical seat and any packing means that might be interposed between them owing to the slow movement of the valve and the delicacy of the valve and its construction is unsatisfactory interfering as it does with valve movement. The flexible valve ring seating as it does on a separate valve seat and supported by the valve solves the problem of preventing leakage through the annular clearance between the valve and valve seat. This ring may give and always seats because the parts are so arranged for the highest position of the lower valve member with respect to the upper that there is always a contact. As changes take place moving the lower valve down with respect to the upper, there is still seating of the flexible disc and the disc is sufficiently flexible so that for such position it conforms to and engages the seat, thereby preventing leakage. As soon as the valve moves toward the open position the flexible valve member is picked up and carried up to travel with the rigid valve member. Owing to the relation between the abutment supporting the flexible member from below and the holding ring holding it from above the flexible valve ring is free to bend upwardly more rapidly than it has to bend down, thus there is no interference with its seating or by it with the seating of the positive seated valve disc above and there is an early and positive lifting of the flexible member from its seat as the valve moves up.

I claim:

1. In combination, a cylindrical valve seat, a cylindrical valve mounted for reciprocation therethrough, there being working clearance between the valve and the seat, a flange projecting upwardly from one end of the seat, concentric therewith, there being a clearance radially between the inner periphery of the flange and the inner periphery of the valve seat, the flange having a plane surface perpendicular to the line of reciprocation of the valve, a boss on the valve projecting upwardly above the seat engaging the periphery thereof and having a plane surface parallel with the plane surface on the flange, a flexible plate, means for holding it on the boss, the plate projecting radially to overlies said flange.

2. In combination, a cylindrical valve seat, a cylindrical valve mounted for reciprocation therethrough, there being working clearance between the valve and the seat, a flange projecting upwardly from one end of the seat, concentric therewith, there being a clearance radially between the inner periphery of the flange and the inner periphery of the valve seat, the flange having a plane surface perpendicular to the line of reciprocation of the valve, a boss on the valve projecting upwardly above the seat engaging the periphery thereof and having a plane surface parallel with the plane surface on the flange, a flexible plate, means for holding it on the boss, the plate projecting radially to overlie said flange, the plate being unsupported between the boss and said flange in line with the clearance between the valve and the seat.

3. In combination a cylindrical valve seat, a cylindrical valve adapted to slide therein and close the opening therethrough, an auxiliary valve seat concentric with the first named seat and projecting above one end thereof, a flexible plate overhanging the auxiliary valve seat, a plane surface boss on the valve of lesser diameter than the valve upon which the flexible plate is permanently mounted, the flexible plate being unsupported between the boss and the auxiliary valve seat, the unsupported portion of the plate overhanging the clearance area between the cylindrical valve and its seat.

Signed at Chicago, county of Cook, and State of Illinois, this 18th day of May, 1929.

GEORGE J. HACHMEISTER.